(12) United States Patent
Zhou et al.

(10) Patent No.: US 7,062,094 B2
(45) Date of Patent: Jun. 13, 2006

(54) SYSTEM AND METHOD FOR LOSSLESS DATA TRANSMISSION

(75) Inventors: Xiaoqi Zhou, Richardson, TX (US); Wenhui Mei, Plano, TX (US); Takashi Kanatake, Dallas, TX (US); Kin Foong Chan, Plano, TX (US)

(73) Assignee: Disco Corporation, Tokyo (JP)

( * ) Notice: Subject to any disclaimer, the term of this patent is extended or adjusted under 35 U.S.C. 154(b) by 664 days.

(21) Appl. No.: 09/683,789

(22) Filed: Feb. 14, 2002

(65) Prior Publication Data

US 2002/0135814 A1 Sep. 26, 2002

Related U.S. Application Data

(60) Provisional application No. 60/278,276, filed on Mar. 22, 2001.

(51) Int. Cl.
*G06K 9/36* (2006.01)
*H04N 1/413* (2006.01)

(52) U.S. Cl. .................. 382/232; 358/426.13
(58) Field of Classification Search ........... 382/232, 382/236, 239; 358/426.13
See application file for complete search history.

(56) References Cited

U.S. PATENT DOCUMENTS

5,231,663 A * 7/1993 Earl et al. .................. 382/159
6,061,118 A * 5/2000 Takeda ........................ 355/47

FOREIGN PATENT DOCUMENTS

EP 0552953 A1 * 7/1993
WO WO 00/03307 * 1/2000

* cited by examiner

*Primary Examiner*—Duy M. Dang
(74) *Attorney, Agent, or Firm*—Smith, Gambrell & Russell, LLP

(57) ABSTRACT

A method for losslessly transmitting data is provided. The data is separated into two or more portions and the second portion is subtracted from the first portion to find a difference. The first portion and the difference are transmitted, and then the second portion is reconstructed by adding the difference to the first portion. The data may comprise two or more images, with each image being a temporally displaced version of the preceding image. Each image may be divided into multiple areas, where the areas on each image correspond to the areas on the other images. A difference may be obtained by subtracting each area of an image from the corresponding area of the preceding image. The first image may then be transferred as a reference image along with the differences, and each image may be reconstructed by adding each difference to the corresponding area of the previous image.

5 Claims, 6 Drawing Sheets

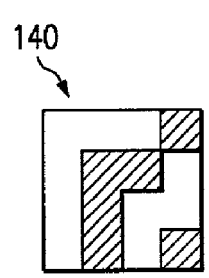
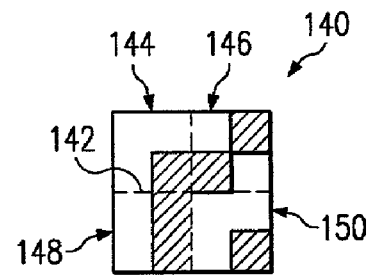
Fig. 10a    Fig. 10b
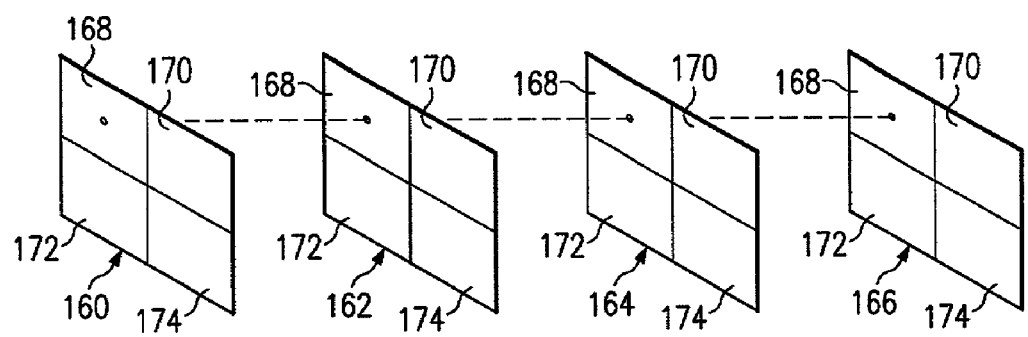
Fig. 11
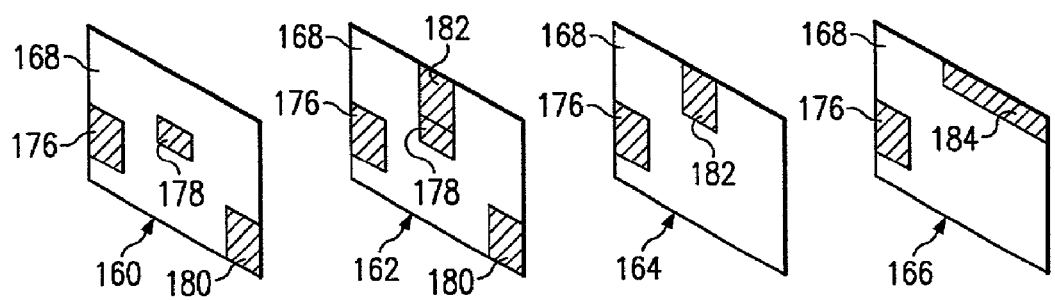
Fig. 12

SYSTEM AND METHOD FOR LOSSLESS DATA TRANSMISSION

CROSS REFERENCE

This application claims the benefit of U.S. Provisional Application No. 60/278,276, filed on Mar. 22, 2001.

BACKGROUND

The present invention relates generally to computer systems, and more particularly, to a lossless data transmission system and method.

Data transmission is a necessary operation for computer systems. Data in a computer system may be transmitted between internal components, peripherals, and/or other computer systems, depending on the type and purpose of the data. Such transmission may occur either synchronously or asynchronously.

The rate at which data is transmitted depends on a variety of factors, such as memory access time and bandwidth, which may form "bottlenecks" or congestion areas which negatively impact the transfer rate. Memory access time determines the speed at which data can be read from and written to memory and varies greatly depending on the type of memory. For instance, memory access times for random access memory are much faster than those for disk drives, which are in turn much faster than most removable media. Bandwidth identifies the maximum rate at which data can be transmitted through the system or to other systems. The bottlenecks limit the bandwidth because the system can only transmit data at the speed of the slowest component in the transmission chain. For example, if a system is capable of transmitting at 1.5 Megabits/second ("Mbps") to a peripheral, but the maximum available bandwidth between the system and the peripheral is 1 Mbps, the bandwidth forms a bottleneck that limits the system to transmitting at the lower rate of 1 Mbps.

Attempts to solve the performance issues presented by bottlenecks have resulted in a number of solutions, none of which are completely satisfactory. One solution has been to use compression techniques to compress the data. Such compression typically reduces the amount of data to be transmitted by removing "unnecessary" data. The actual amount of compression depends on the type of file and compression algorithm used. Compression may be either "lossless" or "lossy." Lossless compression decompresses the compressed data back to a perfect original, bit for bit. Lossy compression often results in a higher compression ratio at the expense of a perfect copy since some of the data is lost during lossy compression.

Yet another partial solution, focusing particularly on graphics, has been to develop a library of basic shapes or "elements." A graphic can then be constructed from the basic shapes in the library, assuming the library has the necessary shapes. This limited approach does not present a viable solution for graphics which contain elements not found in the library and so makes it difficult to construct complex graphics.

Another solution has been to simply provide more bandwidth for the data. This essentially furnishes a bigger "pipe" for the data, but is not a satisfactory solution, particularly for applications requiring the transfer of large amounts of data. This is due in part to the inability to read and write the data to and from memory quickly enough.

Improving memory access times is another partial solution. Current technological solutions to improving memory access times focus largely on the physical design of the memory itself, but existing limitations in memory technology prevent rapid advancements in this area.

Therefore, what is needed is an improved method to transmit large amounts of data efficiently and without loss.

SUMMARY

A technical advance is provided by a method for losslessly transmitting data. In one embodiment, the method comprises separating the data into at least a first portion and a second portion and subtracting the second portion from the first portion to calculate a difference between the first and second portions. The first portion and the difference are transmitted and then the first portion and the difference are added to reconstruct the second portion.

BRIEF DESCRIPTION OF DRAWINGS

FIGS. 10a–10b illustrate the process of image deconstruction using the pattern alphabet of FIG. 9b.

FIG. 11 illustrates the relationships between multiple frames in temporal image encoding.

FIG. 12 illustrates a block extending through the four frames of FIG. 11.

DETAILED DESCRIPTION

The present disclosure relates to lossless data transmission systems, such as can be used in digital photolithographic processing. It is understood, however, that the following disclosure provides many different embodiments, or examples, for implementing different features of one or more inventions. Specific examples of components and arrangements are described below to simplify the present disclosure. These are merely examples and are not intended to limit the invention from that described in the claims.

Computer systems often execute applications which require the transmission of large amounts of data. One such system is a maskless photolithography system, such as the system described in U.S. patent application Ser. No. 09/577,453, filed on May 24, 2000, and also assigned to Ball Semiconductor, Inc., entitled "MASKLESS EXPOSURE SYSTEM" and hereby incorporated by reference as if reproduced in its entirety. In one embodiment, the present invention provides a method of efficiently storing and transmitting data.

Figure 1:
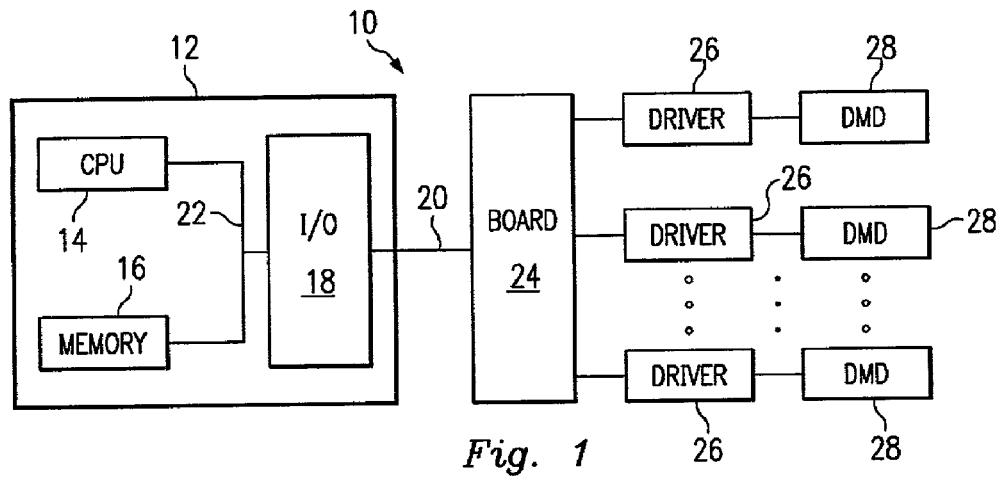
FIG. 1 illustrates an exemplary system for lossless data transmission in a photolithography environment.

With reference now to FIG. 1, an exemplary computer system 10 includes a computer 12, which comprises a central processing unit ("CPU") 14, a memory unit 16, and an input/output ("I/O") device 1 8. The I/O device 18 connects to a peripheral component interconnect ("PCI") bus 20. The components 14, 16, 18, and 20 are interconnected by a bus system 22. It is understood that each of the listed components may actually represent several different components. For example, the CPU 14 may actually represent a multi-processor or a distributed processing system; the memory unit 16 may include different levels of cache memory, main memory, hard disks, and remote storage locations; and the I/O device 18 may include monitors, keyboards, and the like. The computer 12 is connected via the PCI bus 20 to a circuit board 24 which provides multiple connections to a plurality of drivers 26. Each driver is in turn connected to a digital micromirror device ("DMD") 28, which is controllable to redirect light onto a subject such as a semiconductor wafer.

Figure 2:
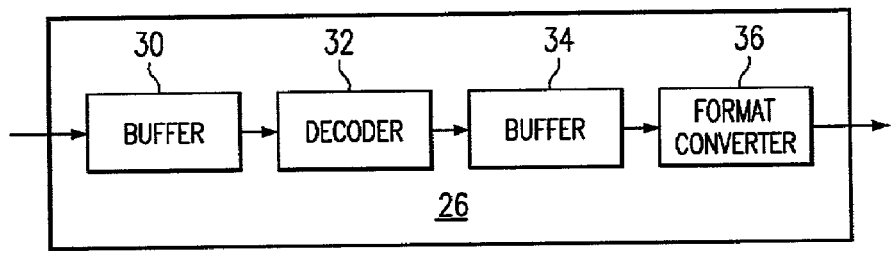
FIG. 2 is a block diagram of basic components of a driver for a digital micromirror device.

Referring now to FIG. 2, an exemplary driver 26 is illustrated. The driver 26 includes a first buffer 30, a decoder 32, a second buffer 34 which is ideally smaller than the buffer 30, and a format converter 36. The operation of this system in terms of photolithographic processing is described below in further detail.

Figure 3:
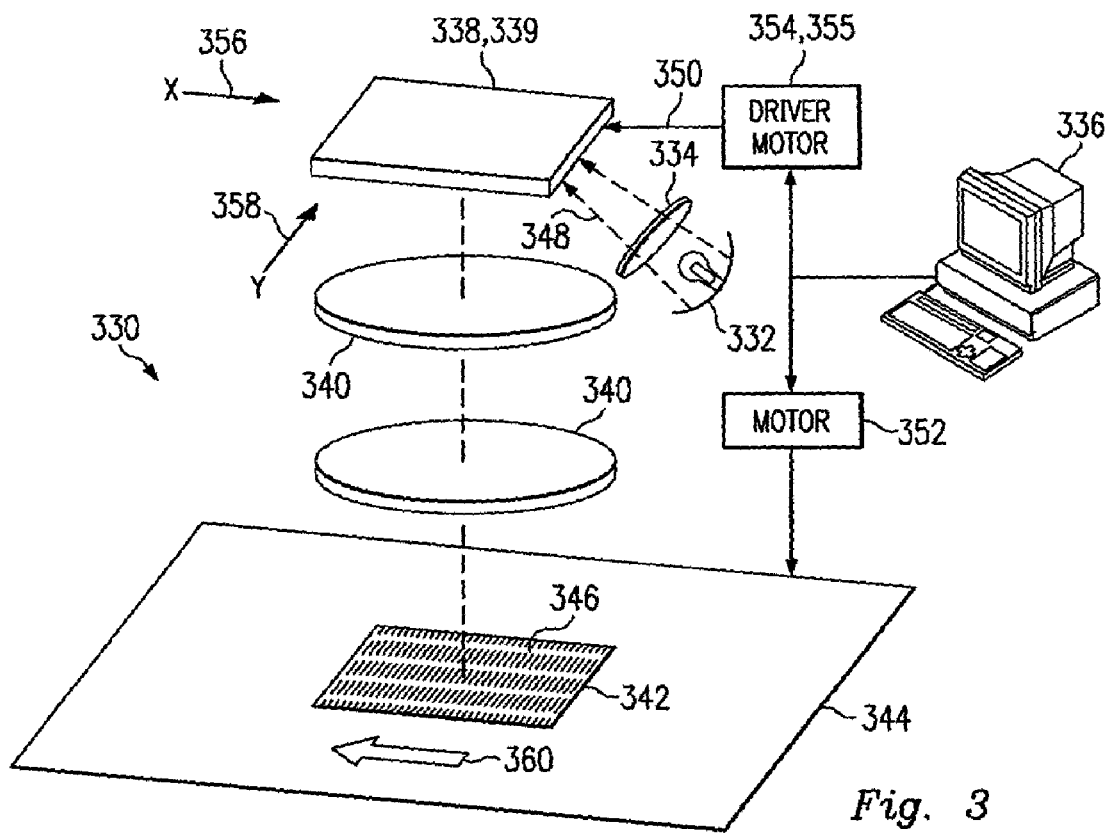
FIG. 3 is a block diagram of a digital photolithography system for implementing various embodiments of the present invention.

Referring now to FIG. 3, a maskless photolithography system 330 includes a light source 332, a first lens system 334, a computer aided pattern design system 336, a pixel panel 338, a panel alignment stage 339, a second lenses system 340, a subject 342, and a subject stage 344. A resist layer or coating 346 may be disposed on the subject 342. The light source 332 may be an incoherent light source (e.g., a Mercury lamp) that provides a collimated beam of light 348 which is projected through the first lens system 334 and onto the pixel panel 338.

The pixel panel 338 is provided with digital data via suitable signal line(s) 350 from the computer aided pattern design system 336 to create a desired pixel pattern (the pixel-mask pattern). The pixel-mask pattern may be available and resident at the pixel panel 338 for a desired, specific duration. Light emanating from (or through) the pixel-mask pattern of the pixel panel 338 then passes through the second lenses system 340 and onto the subject 342. In this manner, the pixel-mask pattern is projected onto the resist coating 346 of the subject 342.

The computer aided mask design system 336 can be used for the creation of the digital data for the pixel-mask pattern. The computer aided pattern design system 336 may include computer aided design ("CAD") software similar to that which is currently used for the creation of mask data for use in the manufacture of a conventional printed mask. Any modifications and/or changes required in the pixelmask pattern can be made using the computer aided pattern design system 336.

Therefore, any given pixel-mask pattern can be changed, as needed, almost instantly with the use of an appropriate instruction from the computer aided pattern design system 336. The computer aided mask design system 336 can also be used for adjusting a scale of the image or for correcting image distortion.

In the present embodiment, the pixel panel 338 is a digital light processor ("DLP") or DMD such as is illustrated in U.S. Pat. No. 5,079,544 and patents referenced therein.

Current DMD technology provides a 600×800 array of mirrors for a set of potential pixel elements. Each mirror can selectively direct the light 348 towards the subject 342 or away from the subject. For the sake of simplicity and clarity, the pixel panel 338 will be further illustrated as one DMD. Alternate embodiments may use multiple DMDs, one or more liquid crystal displays and/or other types of digital panels.

In some embodiments, the computer aided mask design system 336 is connected to a first motor 352 for moving the stage 344, and a driver 354 for providing digital data to the pixel panel 338. In some embodiments, an additional motor 355 may be included for moving the pixel panel, as discussed below. The system 336 can thereby control the data provided to the pixel panel 338 in conjunction with the relative movement between the pixel panel 338 and the subject 342.

The amount of exposure time, or exposure intensity, of light from the pixel panel 338 directly affects the resist coating 346. For example, if a single pixel from the pixel panel 338 is exposed for a maximum amount of time onto a single site of the subject 342, or for a maximum intensity, then the corresponding portion of resist coating 346 on the subject would have a maximum thickness (after non-exposed or under exposed resist has been removed). If the single pixel from the pixel panel 338 is exposed for less than the maximum amount of time, or at a reduced intensity, the corresponding portion of resist coating 346 on the subject 342 would have a moderate thickness. If the single pixel from the pixel panel 338 is not exposed, then the corresponding portion of resist coating 346 on the subject 342 would eventually be removed.

In one embodiment, the maskless photolithography system 330 performs two-dimensional digital scanning by rapidly moving the image relative to the subject in two directions (in addition to the scanning motion). The panel motor 355 is attached to the pixel panel 338 to move the pixel panel in two directions, represented by an x-arrow 356 and a y-arrow 358. The panel motor 355 may be a piezo electric device ("PZT") capable of making very small and precise movements.

In addition, the scanning motor 355 scans the stage 344, and hence the subject 342, in a direction 360. Alternatively, the stage 344 can be fixed and the panel motor 355 can scan the pixel panel 338 (and the lenses 340) opposite to direction 360.

Figure 4:
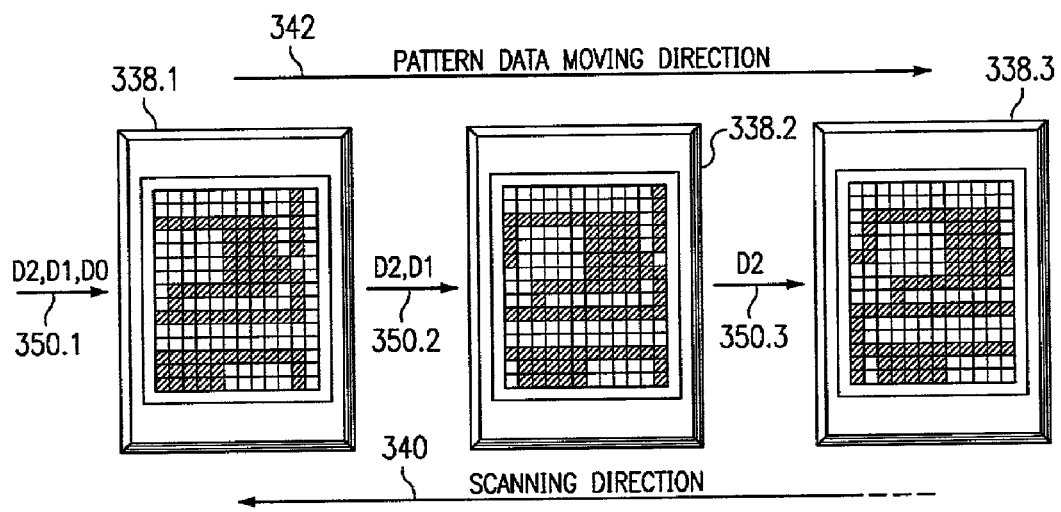
FIG. 4 illustrates various pixel patterns being provided to a pixel panel of the system of FIG. 3.

Referring also to FIG. 4, corresponding to the image scanning described above, the pixel-mask pattern being projected by the pixel panel 338 changes accordingly. This correspondence can be provided, in one embodiment, by having the computer system 336 (FIG. 3) control both the scanning movement 360 and the data provided to the pixel panel 338. The illustrations of FIG. 4 and the following discussions describe how the data can be timely provided to the pixel panel.

FIG. 4 shows three intermediate patterns of pixel panel 338. Since the pattern on the pixel panel 338 and the data on the signal lines 350 change over time, the corresponding patterns on the pixel panel and data on the signal lines at a specific point in time are designated with a suffix "0.1", "0.2", or "0.3". In the first intermediate pattern, the pattern of pixel panel 338.1 is created responsive to receiving data D0 provided through the signal lines 350.1. In the present example, the pattern is created as a matrix of pixel elements in the pixel panel 338.1. After a predetermined period of time (e.g., due to exposure considerations being met), the pattern is shifted. The shifted pattern (now shown as pixel panel 338.2) includes additional data D1 provided through the signal lines 338.2. The shifting between patterns may also utilize a strobing or shuttering of the light source 332.

In the second intermediate pattern of FIG. 4, D1 represents the left-most column of pixel elements in the pattern of DMD 338.2. After another predetermined period of time, the pattern (now shown as pixel panel 338.3) is shifted again. The twice-shifted pattern includes additional data D2 provided through the signal lines 38.2. In the third intermediate pattern of FIG. 4, D2 now represents the left-most column of pixel elements in the pattern of the DMD 338.3. Thus, the pattern moves across the pixel panel 338 in a direction 342. It is noted that the pattern direction 342, as it is being provided to the pixel panel 338 from the signal lines 350, is moving opposite to the scanning direction 340. In some embodiments, the pattern may be shifted in additional directions, such as perpendicular to the scanning direction 340.

Figure 5A:
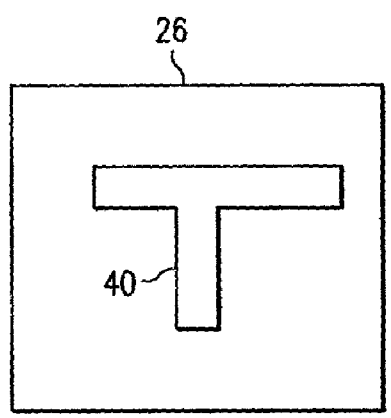
FIGS. 5a–5f illustrate pixel changes across multiple consecutive frames of data during time based compression.

Time based compression Referring now to FIG. 5a, in operation, the computer system 10 of FIG. 1 stores and manipulates an image 40 representing a circuit design that is to be projected onto a subject such as a substrate. The image 40 is extremely large and may be represented in the memory 16 of FIG. 1 as a set of frame data, with each frame comprising a partial image which is offset a predetermined distance from the previous frame. Due to the extremely large size of the frame data set, it is desirable to encode the data before it is sent to a DMD, such as the DMD 28 of FIG. 1. This encoding process reduces the storage and transfer requirements for the data.

For the sake of example, the image 40 comprises a basic "T" shaped design. It is this "T" that is to be projected onto the substrate. The image 40 is represented as frame data in FIGS. 5b–5f, with each frame containing the data required for the DMD 28 to generate a discrete part of the image 40. The encoding process for the frame data is based on the generalization that the number of changes from one frame to the next at the same pixel are generally less than the changes from pixel to pixel in the same frame. For purposes of illustration, the frame data in FIGS. 5b–5f is organized as it is intended to appear on the DMD 28.

The pattern represented by the frame data is shifted across the face of the DMD as described previously in relation to FIG. 4. As each vertical column is shifted across the DMD, each mirror can selectively direct light towards a subject or away from the subject. The DMD 28 includes multiple mirror areas, with six distinct mirrors 42, 44, 46, 48, 50, and 52 selected for purposes of illustration. Each mirror 42–52 is represented by a dark or light square. The dark squares represent mirrors that are directing light towards the subject within the image 40 on the current frame (an "on" state), while the light squares represent mirrors that are directing light away from the subject and/or not within the image 40 on the current frame (an "off" state).

Figure 5B:
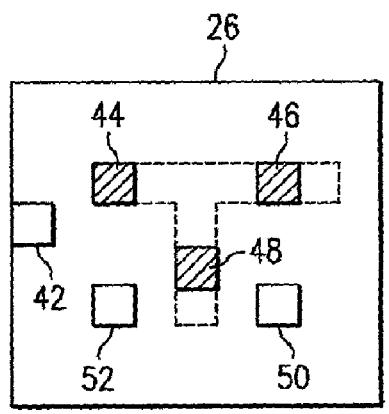
Figure 5C:
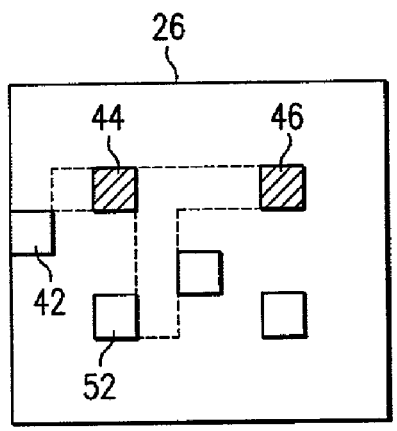

Referring now to FIG. 5b, the mirrors 44, 46, and 48 are directing light toward the inside of the outline of the image 40 and are "on." The mirrors 42, 50 and 52 are directing light outside the image area and are "off." Continuing to the next frame in FIG. 5c, the only mirror that has changed state is mirror 48, which has switched from "on" to "off." Therefore, the data illustrated in FIG. 5c may be stored as the difference between the frames in 5b and 5c, rather than as the state of each of the six mirrors. The difference is encoded by subtracting the data in the second frame from the data in the first frame, and then compressing the difference using known compression techniques.

Figure 5D:
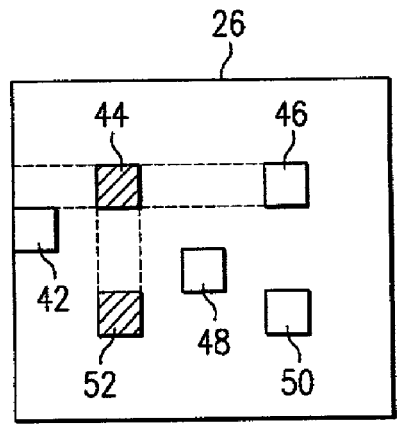
Figure 5E:
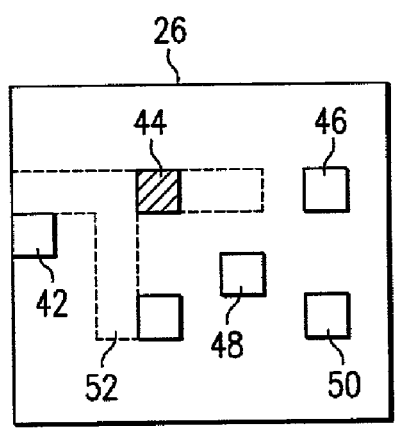
Figure 5F:
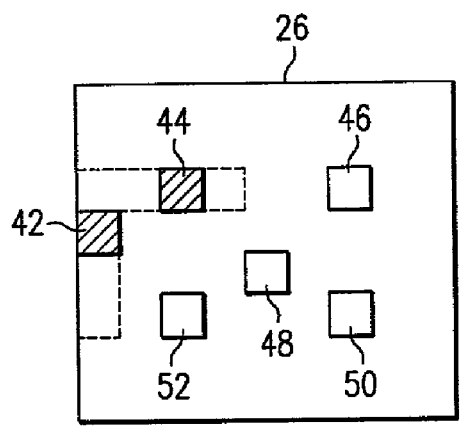

Comparing the frames illustrated in FIG. 5c and FIG. 5d identifies that the mirrors 46 and 52 have changed state. Therefore, the frame data representing FIG. 5d will contain this difference, which is again compressed using known techniques. The difference between FIG. 5d and FIG. 5e encodes the change of state in the mirror 52. Comparing the frames in FIGS. 5e and 5f identifies the final difference, which is the state change of mirror 42 from "off" to "on." Referring again to FIG. 1, the encoded frame data, which includes the first full frame and the subsequent frame differences, is stored in the memory 16 before it is transferred via the PCI bus 20 to the board 24 and the driver 26.

Referring again to FIG. 2, the encoded frame data is received from the board 24 and stored in the buffer 30. Before the frame data can be used by the DMD 28, it should be decoded. The driver transfers the complete first frame of the frame data to the buffer 34, and from there to the format converter 36. The format converter 36 makes any needed changes to transform the frame data into the proper format for the DMD 26, and then transfers the frame to the DMD 28.

When the next frame is needed by the DMD 28, the driver decompresses the data representing the difference between the first and second frames and adds it to the first frame in the buffer 34. This addition reconstructs the complete second frame as it existed before it was encoded by the computer 12. The complete second frame is then sent to the DMD 28. This process of decompressing the difference representing the next frame, adding it to the current frame, and sending the new frame to the DMD continues until all the required frame data has been transferred.

In an alternative embodiment, the encoder is located on the circuit board 24.

In another alternative embodiment, the computer 12 contains a network interface and is connected to a network. The network may be any type of networks, such as a local area network, a company wide intranet, and/or the Internet. This permits the computer 12 to share components with other computers connected to the network, as well as exchange data and perform other typical network functions.

Fundamental Element Extraction In one embodiment, an image is reduced to a combination of fundamental elements to minimize the size of the data representing the image. For example, with respect to photolithography, a design to be projected onto a substrate may be viewed as a combination of fundamental elements.

Figure 6:
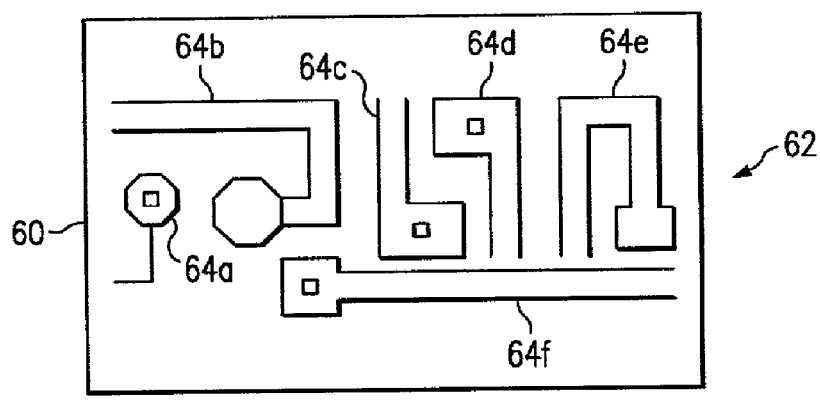
FIG. 6 is an exemplary circuit design.

Referring now to FIG. 6, a portion of a circuit design 62 is represented by an image 60 that is to be projected onto a substrate such as a wafer. The circuit design 62 includes multiple circuit elements, such as those elements labeled 64a–f. Each circuit element can be further defined as one or more fundamental elements, such as a line, octagon, square or rectangle. The fundamental elements may be stored in a library, which allows the editing of existing elements and the addition and/or removal of additional elements.

Figure 7A:
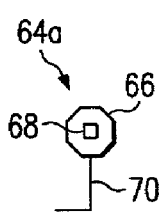
FIGS. 7a–7c demonstrate possible deconstruction steps during fundamental element extraction.
Figure 7B:
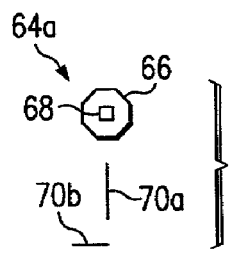
Figure 7C:
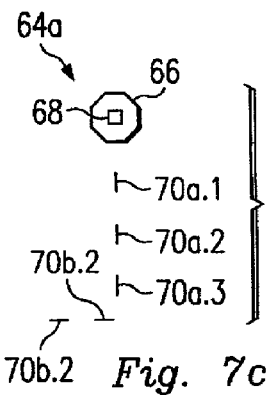

The deconstruction of a circuit element into a number of fundamental elements may occur as follows. Referring now to FIG. 7a, the circuit element 64a of FIG. 6 includes an octagon 66, a square 68, and a line 70. The element 64a can be reduced to an octagon 66, a square 68, and two lines 70a and 70b as illustrated in FIG. 7b. The lines 70a and 70b can then be further broken into one or more standardized line segments 70a.1, 70a.2, 70a.3, 70b. and 70b.2, keeping the octagon 66 and the square 68 as shown in FIG. 7c.

Alternatively, the square 68 may be drawn as a number of straight lines, allowing the circuit element 64a to be further reduced to a number of straight lines and an octagon. In addition, the octagon 66 may be represented as a series of line segments. In this manner, a circuit element may be reduced to a number of fundamental elements, with the actual number of elements dependent upon the size and variation available in the library.

Figure 8:
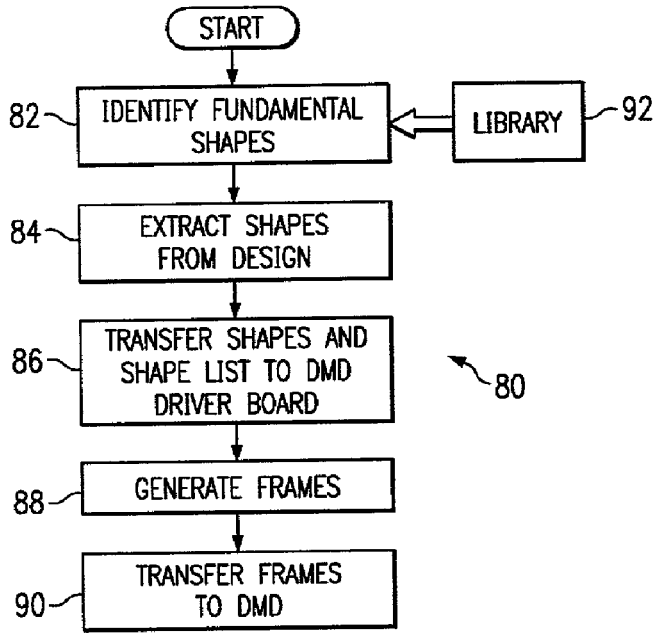
FIG. 8 is a flowchart of a process for fundamental element extraction.

Referring now to FIG. 8, an exemplary sequence 80 for reducing an image to a set of fundamental elements is described. Continuing the previous example, the image contains a circuit design. The sequence 80 begins in step 82 by identifying the fundamental elements of the design. A library of fundamental elements 92 is used as a reference for the identification process, which allows elements to be added, removed, or edited as design requirements change. The identification process searches the design for any occurrence of known patterns stored in the library 82.

Once the fundamental elements of the design have been identified, the sequence 80 continues to step 84, where the combination of the fundamental elements is extracted in such a way as to capture the information needed to recreate the design. This may be accomplished by creating a location list which contains information about each element, including where the fundamental elements are found in the design, the orientation of each element, and similar information. The location and orientation of each element may be found by comparing each element to the design itself. Alternatively, the location information may be extracted directly from the design data if the data supports such functionality.

The elements and the location list are transferred to the DMD driver in step 86. In a system with multiple drivers, each driver may have a unique list of elements and locations. In step 88, the individual frames are generated by the driver using the elements and location lists. Finally, in step 90, the driver transfers the frames to the DMD to be displayed.

Referring now to FIG. 8, an exemplary sequence 80 for reducing an image to a set of fundamental elements is described. Continuing the previous example, the image contains a circuit design. The sequence 80 begins in step 82 by identifying the fundamental elements of the design. A library of fundamental elements 92 is used as a reference for the identification process, which allows elements to be added, removed, or edited as design requirements change. The identification process searches the design for any occurrence of known patterns stored in the library 92.

Another application of the present embodiment is to use the DMD to simulate horizontal motion of the substrate. The elements can be drawn at the correct position on the DMD and so the need to reposition the substrate or reticle is negated.

Yet another application is to use many overlapping fundamental elements to duplicate a substrate pattern on the DMD. This negates the need for horizontal substrate motion and so requires fewer changes to the DMD.

The present embodiment may also be used in applications outside of photolithography. For example, a single graphic file or a series of graphic files such as a video clip may be reduced to a set of fundamental elements before storage and/or transfer.

In an alternative embodiment, the search identification process may search for patterns which repeat in the design. These patterns are then used to form a library by representing each element as an image.

Pattern Alphabet Compression In an alternative embodiment, a pattern alphabet compression method is provided. The pattern alphabet compression utilizes a set of pattern elements based on an "alphabet." Each element in the pattern contains pixels of M×N bits, where M and N may be equal numbers.

Figure 9B:
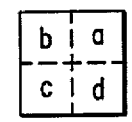
FIGS. 9a–9b illustrate one embodiment of a basic pattern alphabet.
Figure 9A:
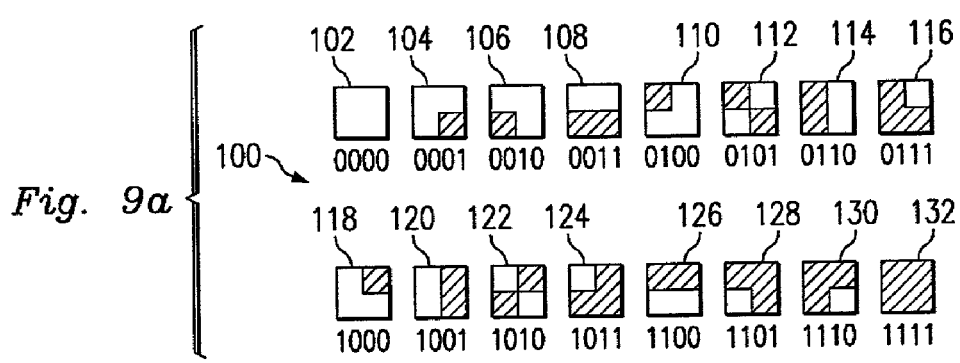

Referring now to FIG. 9a, a pattern alphabet 100 includes sixteen unique elements or "letters," labeled 102–132. As illustrated in FIG. 9b, each element 102–132 comprises a 2×2 block of pixels "a", "b", "c", and "d", for a total of four pixels per element. The alphabet is represented in binary form by a nibble comprising 2×2=4 bits. Each pixel may be either white (a binary 0) or black (a binary 1). Therefore, referring again to FIG. 9a, the sixteen elements represent the entire range of possible combinations that can be created in the alphabet. In this example, the alphabet is arranged so that the starting element is 0000 and the ending element is 1111. The progression through the elements proceeds in a counter-clockwise fashion beginning with the upper right-hand corner (pixel "a") and continuing in a binomial fashion so that the alphabet becomes 0000, 0001, 0010, 0011, 0100, 0101, 0110, 0111, 1000, 1001,1010, 1011, 1100, 1101, 1110, 1111.

Referring now to FIG. 10a, an image 140 includes various shapes. This image is to be compressed using the pattern alphabet 100 of FIG. 9a. To accomplish this, the image 140 is first divided into a grid 142 comprising four 2×2 blocks 144, 146,148 and 150 as illustrated in FIG. 10b. Each grid block 144, 146, 148 and 150 in the image 140 contains the same number of pixels as the elements 102–132 in the pattern alphabet of FIG. 9a. The grid 142 is static and so the lines of the grid represent boundaries.

Referring still to FIG. 10b, the pattern of block 144 is compared with each element 102–132 of the pattern alphabet 100. When a match is found between the block 144 and one of the elements 102–132, that element is used to represent the block 144 in the compression scheme. In the case of block 144, the matching element in the pattern alphabet 100 is the element 104 which represents 0001. The remaining blocks 146, 148 and 150 are then compared to the elements of the pattern alphabet 100 in the same manner. This comparison results in finding that block 146 matches element 122 (1010), block 148 matches element 120 (1001) and block 150 matches element 104 (0001). Therefore, the three elements 104, 120 and 122, in conjunction with ordering information regarding which elements belong in which grid locations, can be used to represent the entire image 140.

If the pattern alphabet does not contain all of the possible elements, then one or more special patterns may need to be created for a given image. For example, an alphabet is constructed using a sixteen bit word in hexadecimal to encode the entire alphabet. Therefore, with N=4, each element in the alphabet has a maximum size of 4×4=16 pixels and the alphabet has a maximum of 65536 elements ranging from 0000 to FFFF. If N=8, then each element becomes 8×8=64 pixels, but the alphabet is still limited to the 65536 elements that can be encoded with the sixteen bit word. Therefore, special patterns may be used to represent patterns not present in the incomplete alphabet. These special patterns may vary in complexity, with some representing relatively complex circuit structures such as static memory cells. The number of special patterns may be limited to maximize the compression ratio.

Temporal Image Encoding In an alternative embodiment, a stream of equally sized images is compressed with no data loss. One example of such an image stream is a set of frame data containing multiple frames, where each frame captures changes in the image that occur over time. The data in each frame, when viewed on a single frame basis, may appear to be random. This randomness makes it difficult to compress the data in a lossless manner with traditional compression techniques. Temporal image encoding is based on the assumption that changes are relatively small from frame to frame, and so compressing an image by encoding the difference between the frames is more efficient than encoding the entire frame each time.

Referring now to FIG. 11, a set of frame data is illustrated with four frames 160, 162, 164 and 166. Each frame is divided into four blocks of pixels 168, 170, 172, and 174. Each block is the same size of Mx×Ny pixels, where M and N define the number of pixels and "x" and "y" indicate directions in a coordinate system. Each frame includes the four blocks with the same Mx and Ny coordinates. For example, block 168 extends through frames 160, 162, 164, and 166, and each frame has the same block number for that location. A list is associated with each block which includes the number of the frame where the data changes and the new data. The number of frames contained in each block is controlled by the value Ft, which in the case of this example equals four.

In operation, the first frame 160 of an image is used as a reference image. The data represented by this reference image serves as a starting point for the list. Subsequent changes in the frames 162, 164 and 166 can then be identified and recorded as follows. The frame 1 60 is divided into blocks of Mx×Ny pixels which, with Ft equal to 4, extend through the following three blocks 162,164, and 166.

Referring now to FIG. 12, in which the single block 168 is used as an example, a list is created and associated with the block 168. The list contains data present in block 168 as it exists in frame 160, which includes the location and properties of the data 176, 178, and 180.

The data in block 168 of frame 162 is then compared to the data in the block 168 of the preceding frame 160, and only changes which have occurred from frame 160 to frame 162 are added to the list. Therefore, the list for block 168 will contain information regarding the addition of the data 182 in frame 162.

Similarly, the data in block 168 of frame 164 is then compared to the data in the block 168 of the preceding frame 162, and only changes which have occurred from frame 162 to frame 164 are added to the list. Therefore, the list for block 168 will contain information regarding the removal of the data 178 and 180 in frame 164.

For the last frame in the frame set Ft, the data in block 168 of frame 166 is then compared to the data in the block 168 of the preceding frame 164 and only changes which have occurred from frame 164 to frame 166 are added to the list. Therefore, the list for block 168 will contain information regarding the removal of the data 182 and the addition of the data 184 in frame 164.

Therefore, rather than sending the entire block for each frame, only the changes that occur in a particular block relative to the previous block are required. This minimizes the data transfer requirements by transferring the data which changes from frame to frame, but not transferring data which has not changed.

The frame images are then recreated from the list by making modifications to the previous frame. To create a new frame, the next frame number for each block is compared to the current frame number. If the frame number is less than or equal to the current frame, then the frame data is added to the appropriate block in the buffer and the block's pointer is updated to reflect the current frame.

This process is repeated for each of the blocks 170, 172, and 174 of each of the frames 160, 162, 164, and 166 of FIG. 11. After the frame set defined by Ft and represented by the list has been transferred, a new list will be started for the next frame set.

In order to keep the frame numbers small, a value should be chosen for Ft which allows a suitable level of compression while limiting the list to a certain number of frames. After this time, a new reference image will be transferred as frame one and a new frame sequence can follow.

In the special case where Mx and Ny both equal one, the time change is being encoded for each pixel. If Ft is equal to the total number of frames, then the entire sequence is coded into the list. Therefore, by altering the values of Mx, Ny, and Ft, the algorithm can be tuned to maximize the data compression.

Figure 13:
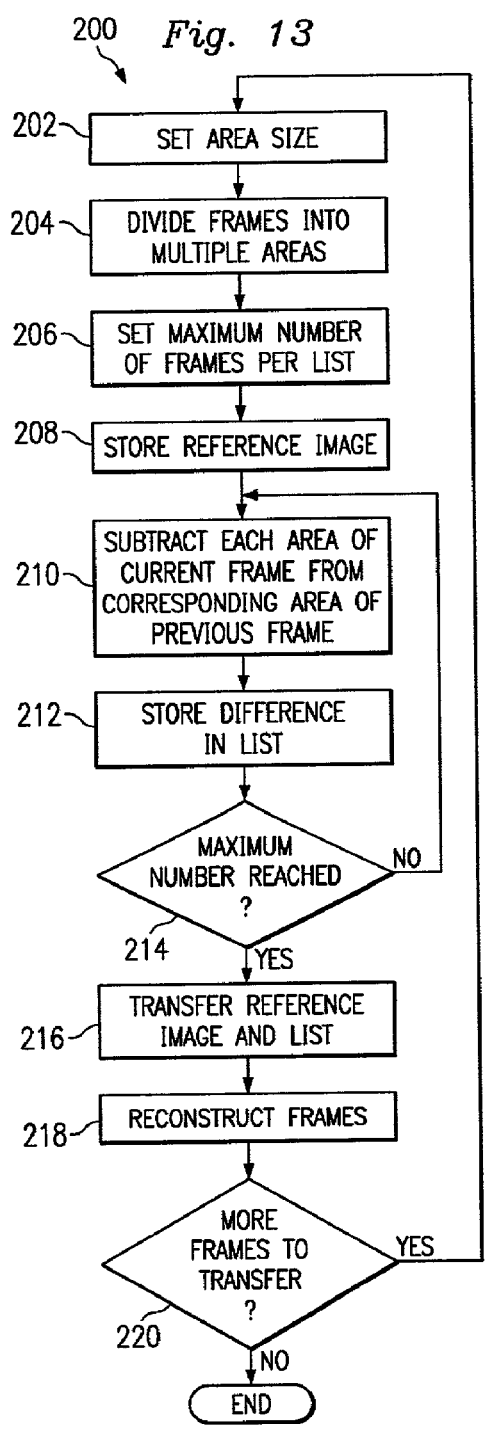
FIG. 13 is a flowchart of a method that may be executed on the frames illustrated in FIGS. 11 and 12.

Referring now to FIG. 13, in another embodiment, a method 200 illustrates a process that may be executed with respect to frames as described in reference to FIGS. 11 and 12. In steps 202 and 204, an area size is set and each of a plurality of frames are divided into multiple areas of the defined size. As stated previously, each area may correspond to an associated area on the preceding and following frames. In step 206, a maximum number of frames is defined for a list. This number, along with the area size, may be used to optimize the efficiency of a data transfer. A reference image, which is generally the first frame of a set of frames defined by the maximum number, is stored in step 208. In step 210, each area of the current frame is subtracted from the corresponding area of the previous frame, and the difference is stored in the list in step 212. The storing may occur, for example, by adding a pointer to the list that identifies the memory location containing the difference.

In step 214, a determination is made as to whether the maximum number of frames as defined in step 206 has been reached. If no, the method 200 repeats the steps 210 and 212 until the maximum number is reached. If yes, the method 200 continues to step 216, where the reference frame and the list are transferred. In step 218, the frames may be reconstructed by adding the difference of each area to the corresponding area of the previous frame. In step 220, a determination is made as to whether more frames remain to be transferred. If no, the method 200 ends. If yes, the method 200 returns to step 202 to begin the transfer of the next set of frames.

It is noted that steps may be altered or omitted entirely, while other steps may be added to the method 200. For example, the reconstruction of a set of frames may not occur until all of the frames have been transferred.

Zooming In an alternative embodiment, an image is created and stored in the form of a source geometry, which includes such information as the location and orientation of the image. The image may be rendered directly from the source geometry using a graphics processor. One example of such an image is a circuit design used in photolithography.

During photolithography, a circuit design is generally projected onto a substrate using frame data, which allows the design to be drawn incrementally rather than all at once. The circuit design is often represented in the source data as a geometric pattern. For example, the source data might represent a particular line with instructions to draw a line of a specified length from one defined point to another. Before this information can be projected onto a substrate by a DMD, it is necessary for the information be converted to bitmap data. Therefore, the geometric data should be converted to bitmap data for each frame. This conversion process requires processing overhead and time, as well as increased frame size.

It is, therefore, desirable to render the circuit design more efficiently. A circuit design, like any image, can be viewed as a combination of triangles. Thus, one possible representation of a circuit design is as a list of triangles, with the list containing information such as the location of the triangles' vertices.

Figure 14A:
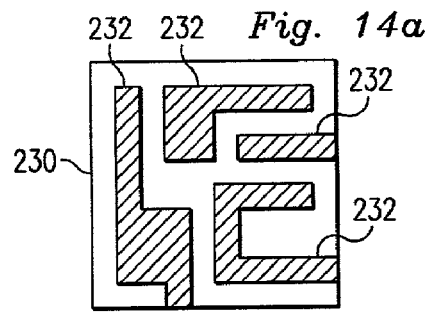
FIGS. 14a–14b detail a circuit design and a frame formed by sampling every third bit of the design.
Figure 14B:
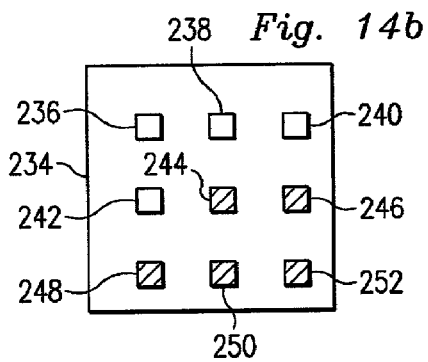

The geometric source data allows flexibility in selecting the data which is to be included in a frame. For example, referring now to FIGS. 14a and 14b, a circuit design 230 may contain point data 232 which is to be drawn to a set of frames. An exemplary frame 234 will contain point data that is sampled from the source data using nonadjacent but evenly spaced points. For example, the circuit design may be sampled at a "zoomed out" perspective of 3×. This means that one bit of every 3 in the circuit design 230 will be included in the frame 234. Therefore, the bits 236, 238, 240 and 242 indicate the lack of a circuit structure at those locations, while bits 244, 246, 248, 250 and 252 indicate that a circuit structure should be "drawn" at that point.

The drawing process can be accomplished using graphics hardware which is capable of processing frame data which is in the form of geometric images. One such device for rendering an image from geometric source data is a graphics processing unit ("GPU"), such as are commonly used on personal computer video cards. A GPU may be controlled using a software language such as OpenGL, although many languages and/or devices may be used to control the GPU. OpenGL allows the separation of the geometry of the design from the viewing angle, which in turn allows the viewing angle to change without altering the design. OpenGL also simplifies performing transformations on the geometric data, such as rotating and/or scaling the design. These transformations may be done without altering the underlying data. In a photolithography environment, for instance, any frame of the design may be rendered directly from the source geometry by manipulating the transformations and the viewing position.

Figure 15:
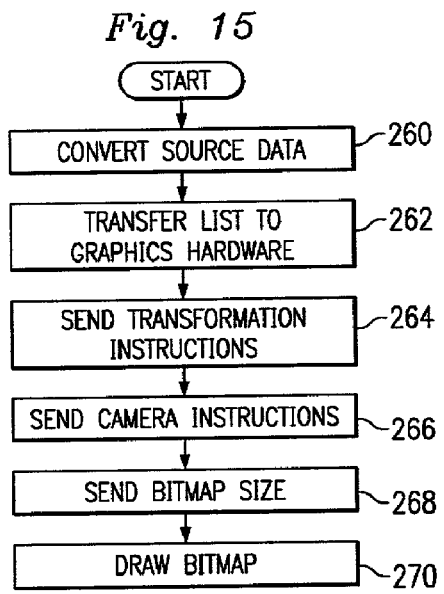
FIG. 15 is a flowchart illustrating exemplary steps for rendering geometric source data.

Referring now to FIG. 15, the source data for a circuit design, such as the circuit design of FIG. 14, is to be drawn by graphics hardware in a photolithography system. The graphics hardware typically includes a GPU and associated buffers and buses for storing and transferring the data.

In step 260, the source data is converted to a list of triangles, which may include such information as the location of the triangles' vertices. The list of triangles is then transferred to the graphics hardware in step 262, which in this example utilizes the OpenGL Display List. Instructions are then sent to the GPU and any associated hardware in step 264 regarding the data transformations to perform (rotation, scale change, etc.) and exactly how to perform them.

In step 266, the GPU is given instructions as to the location of the "camera." This informs the GPU of the position from which the data is to be viewed or the area of the substrate that is visible. The GPU is then given parameters detailing the size of the bitmap to be created in step 268. Finally, in step 270, the GPU draws the triangles onto the bitmap.

One advantage of this embodiment is that automatic compensations may be performed to adjust for changes in the substrate, such as those due to shrinking, swelling, and/or manufacturing errors. In addition, motion of the substrate may be simulated by varying the position of the viewing area.

In an alternative embodiment, a postscript interpreter may be used instead of a GPU. Instead of the "zooming" technique used to capture the pixel information in the previous embodiment, the pixels may be extracted by varying the dots per inch ("DPI") resolution. However, because the interpreter may not have the ability to perform transformations automatically on the image, any transformations should to be performed prior to the conversion to postscript.

While the invention has been particularly shown and described with reference to the preferred embodiments thereof, it will be understood by those skilled in the art that various changes in form and detail may be made therein without departing form the spirit and scope of the invention, as set forth in the following claims.

The invention claimed is:

1. A method for transferring a design for projection in an imaging system, the method comprising:
   identifying a plurality of fundamental shapes occurring in the design by comparing discrete portions of the design to a library containing the fundamental shapes;
   extracting the fundamental shapes from the design; and
   transferring the extracted fundamental shapes for projection in the imaging system.

2. The method of claim 1 further including reconstructing the design from the transferred fundamental shapes.

3. The method of claim 2 further including:
   adding the extracted fundamental shapes to a list; and
   transferring the list.

4. The method of claim 3 further including generating a plurality of ordered frames from the list and the fundamental shapes, wherein each frame is temporally shifted from a preceding frame and a following frame.

5. The method of claim 3 further including:
   dividing the fundamental shapes and list into a plurality of portions; and
   transferring the plurality of portions to a plurality of drivers for projection.

* * * * *